US011489285B1

(12) United States Patent
Hsu et al.

(10) Patent No.: US 11,489,285 B1
(45) Date of Patent: Nov. 1, 2022

(54) ADAPTER ASSEMBLY

(71) Applicant: Delta Electronics, Inc., Taoyuan (TW)

(72) Inventors: Chih-Kai Hsu, Taoyuan (TW); Jui-Yen Chin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/358,190

(22) Filed: Jun. 25, 2021

(30) Foreign Application Priority Data

Apr. 26, 2021 (CN) .......................... 202110454834.X

(51) Int. Cl.
*H01R 13/512* (2006.01)
*H01R 13/52* (2006.01)
*B60L 53/16* (2019.01)

(52) U.S. Cl.
CPC ....... *H01R 13/5202* (2013.01); *H01R 13/512* (2013.01); *H01R 13/5213* (2013.01); *B60L 53/16* (2019.02); *H01R 2201/26* (2013.01)

(58) Field of Classification Search
CPC .............. H01R 13/5202; H01R 13/512; H01R 13/5213; H01R 2201/26; H01R 33/94; H01R 31/06
See application file for complete search history.

(56) References Cited

U.S. PATENT DOCUMENTS

| | | | |
|---|---|---|---|
| 6,328,581 B1 * | 12/2001 | Lee ........................ | H01R 27/00 439/106 |
| 7,175,474 B1 * | 2/2007 | Chang .................... | H01R 31/06 439/501 |
| 8,696,374 B2 * | 4/2014 | Oe .......................... | B60L 53/18 439/321 |
| 10,046,658 B2 * | 8/2018 | Mueller ................. | H01R 31/06 |
| 10,559,916 B1 * | 2/2020 | Lo .......................... | H01R 31/06 |
| 2011/0204715 A1 * | 8/2011 | Nakamura .............. | B60L 53/16 307/10.1 |
| 2017/0225577 A1 * | 8/2017 | Chuang .............. | H01R 13/5219 |

FOREIGN PATENT DOCUMENTS

| | | |
|---|---|---|
| CN | 207165823 U | 3/2018 |
| CN | 209930153 U | 1/2020 |
| TW | M463639 U | 10/2013 |
| TW | I695554 B | 6/2020 |
| TW | M602486 U | 10/2020 |

* cited by examiner

*Primary Examiner* — Tho D Ta
(74) *Attorney, Agent, or Firm* — Kirton McConkie; Evan R. Witt

(57) ABSTRACT

The present disclosure provides an adapter assembly. Portion of the main body of the plug adapter is penetrated through the opening and exposed to the exterior of the accommodation space. Each protrusion is penetrated through the concave and exposed to the exterior of the accommodation space. Each protrusion exposed to the exterior of the accommodation space is connected with the position-limiting portion through the rotation of the plug adapter. Each fastening element is plugged into the first hole and the second hole. The plug adapter is fastened to the casing through the fastening element and the connection between the protrusion and the position-limiting portion. The adapter assembly includes two impact bearing points. One is formed by the fastening element, and the other is formed by the connection between the protrusion and the position-limiting portion. The stability and the waterproof capability of the adapter assembly are enhanced.

10 Claims, 13 Drawing Sheets

ADAPTER ASSEMBLY

CROSS-REFERENCE TO RELATED APPLICATION

This application claims priority to China Patent Application No. 202110454834.X filed on Apr. 26, 2021. The entirety of the above-mentioned patent application is incorporated herein by reference for all purposes.

FIELD OF THE INVENTION

The present disclosure relates to an adapter assembly, and more particularly to an adapter assembly applied to a vehicle charger.

BACKGROUND OF THE INVENTION

With the rising of environmental protection, the development of electric vehicle has become a popular trend. Generally, the plug applied to the vehicle charger of the electric vehicle is used to receive power from a power source and have different types according to different countries. Therefore, the vehicle charger needs different adapter assemblies to adapt the plugs with different types. The vehicle charger can use different types of the adapter assemblies to connect with the plugs with different types according to different countries, so that the vehicle charger can receive the power transmitted through the plugs of different countries.

Conventional adapter assembly includes a casing, a plug adapter and a screw. The plug adapter is disposed around the casing. The plug adapter is fixed on the casing through the screw, and the screw is disposed in the interior of the casing. Since the plug adapter is fixed on the casing by using the screw merely, when the adapter assembly is dropped and subjected to an impact, the screw is also subjected to an impact. Under this circumstance, the screw is dropped easily so that the plug adapter is separated from the casing. Consequently, the stability of the adapter assembly is reduced. In addition, the space between the plug adapter and the casing forms a gap so that moisture from exterior of the casing may be introduced into the interior of the casing through the gap easily. Consequently, the waterproof capability of the adapter assembly is reduced. Moreover, the screw is screwed on the interior of the casing so that the application flexibility of producing the adapter assembly in the product line is reduced. The fabrication of the adapter assembly is difficult.

Therefore, there is a need of providing an improved adapter assembly in order to address the drawbacks of the conventional technology.

SUMMARY OF THE INVENTION

An object of the present disclosure provides an adapter assembly with enhanced stability, enhanced waterproof capability and enhanced application flexibility.

In accordance with an aspect of the present disclosure, an adapter assembly is provided. The adapter assembly includes a casing and a plug adapter. The casing includes a plurality of side walls, a front cover and a rear cover. The plurality of side walls are connected with each other and disposed between the front cover and the rear cover. The plurality of side walls, the front cover and the rear cover collaboratively defines an accommodation space located in the casing. The front cover includes an opening, a plurality of concaves and a plurality of position-limiting portions. The opening is in communicated with the accommodation space. The plurality of concaves are concavely formed from an inner surface of the opening. The plurality of position-limiting portions are disposed on the inner surface of the opening of the front cover. Each of the plurality of position-limiting portions is extended from the inner surface of the opening toward a center of the opening. The plurality of position-limiting portions and the plurality of concaves are arranged alternately. The plug adapter is detachably assembled with the casing and includes a main body and a plurality of protrusions. The plurality of protrusions are disposed on an outer surface of the main body. The plurality of protrusions are corresponding in position to the plurality of concaves in a one-to-one relationship. When the plug adapter is assembled with the casing, portion of the main body is disposed in the accommodation space, and the other portion of the main body is penetrated through the opening and exposed to the exterior of the accommodation space. Each of the plurality of protrusions is penetrated through corresponding one of the plurality of concaves and exposed to the exterior of the accommodation space. Each of the plurality of protrusions exposed to the exterior of the accommodation space is connected with corresponding one of the plurality of position-limiting portions through the rotation of the plug adapter so that the plug adapter is assembled with the casing.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
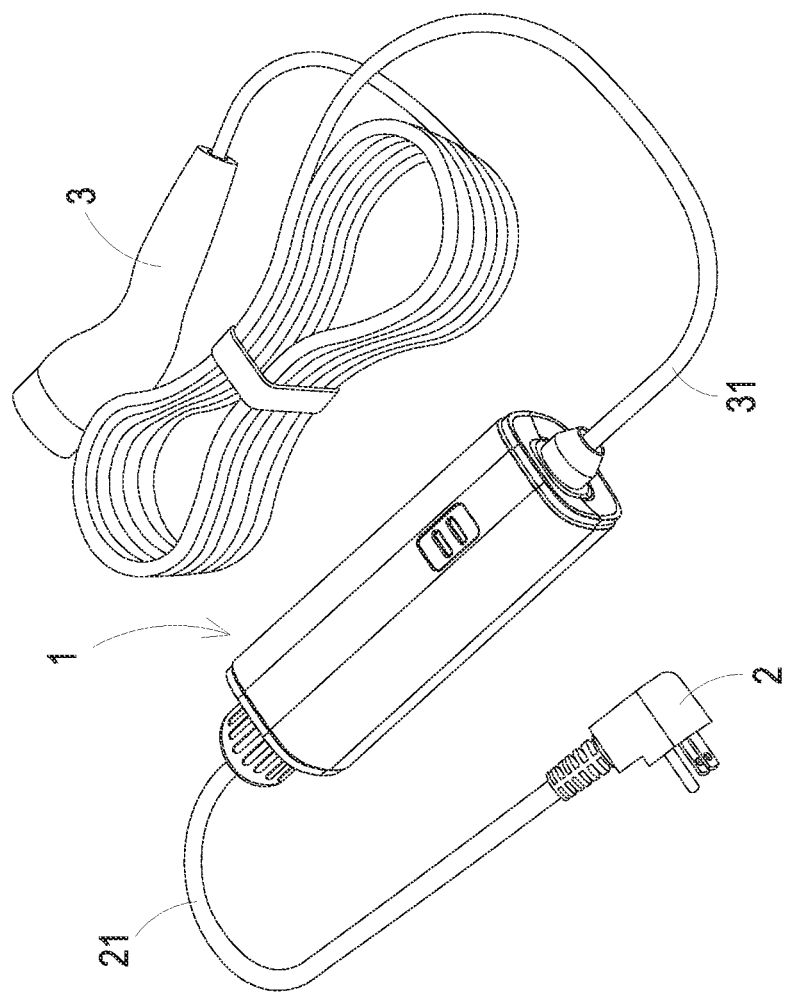
FIG. 1 is a schematic perspective view illustrating the structure of an adapter assembly applied to a vehicle charger according to an embodiment of the present disclosure.
Figure 2:
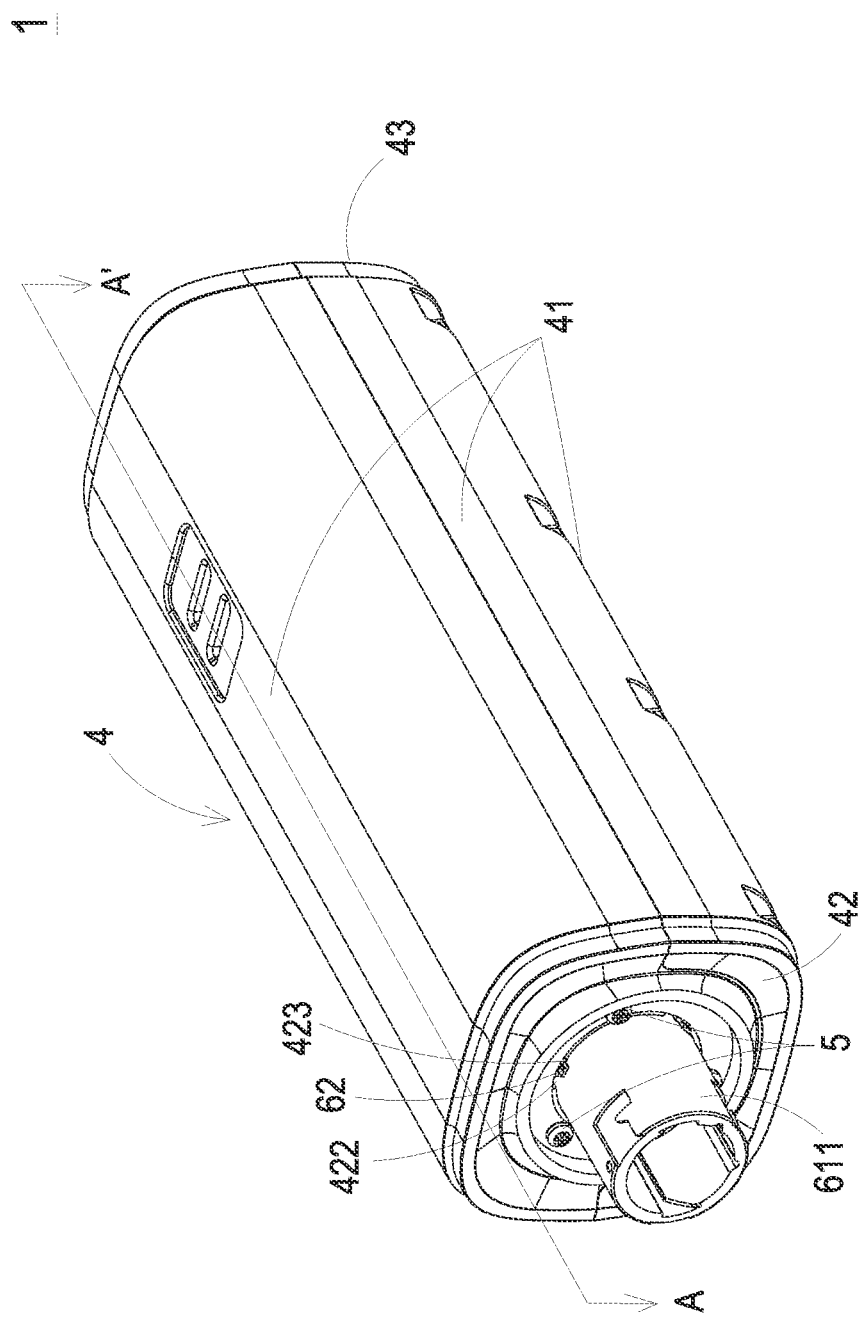
FIG. 2 is a schematic perspective view illustrating the structure of the adapter assembly as shown in FIG. 1 and taken along another viewpoint.
Figure 3:
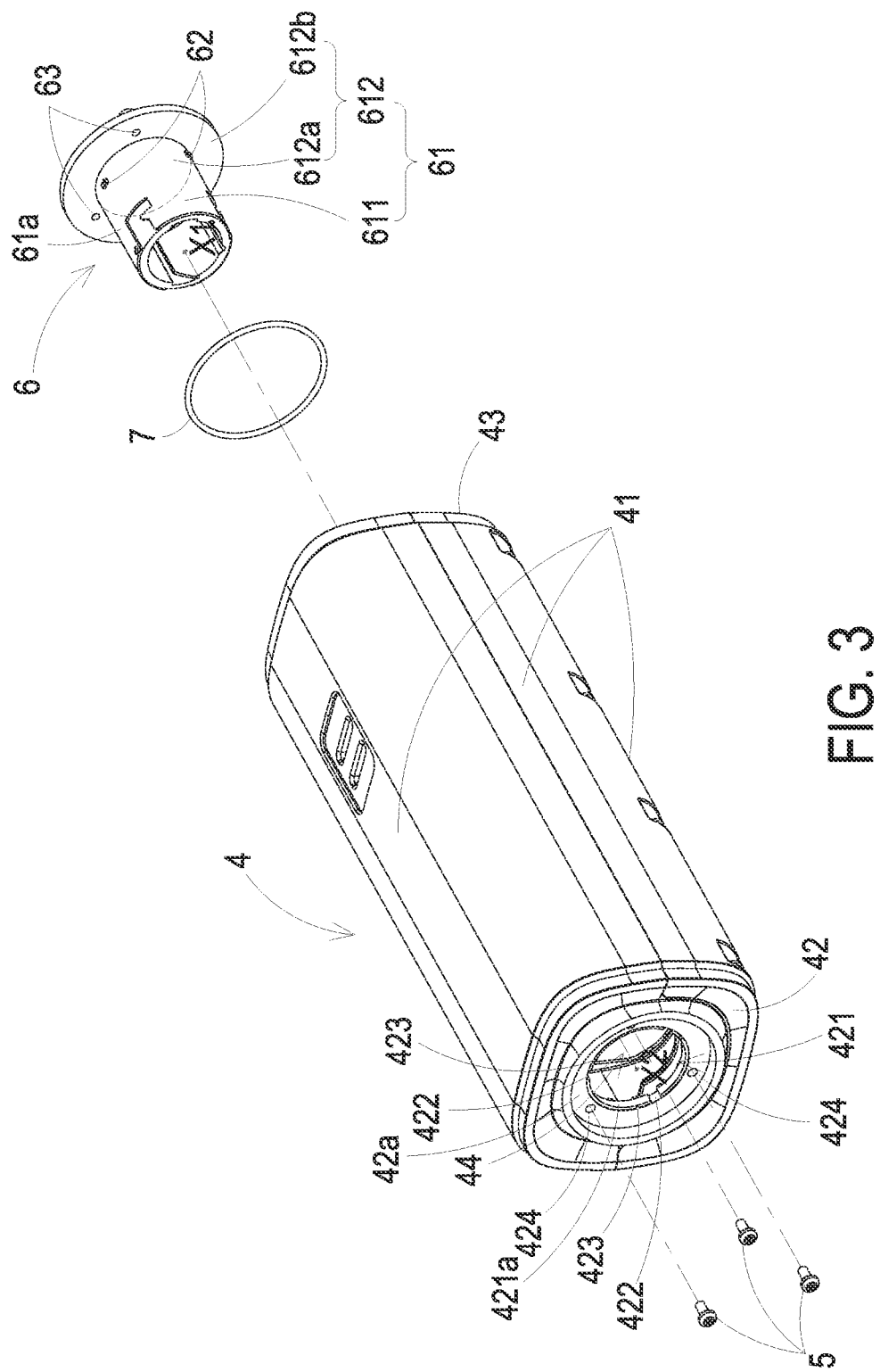
FIG. 3 is a schematic exploded view illustrating the structure of the adapter assembly as shown in FIG. 2.
Figure 4:
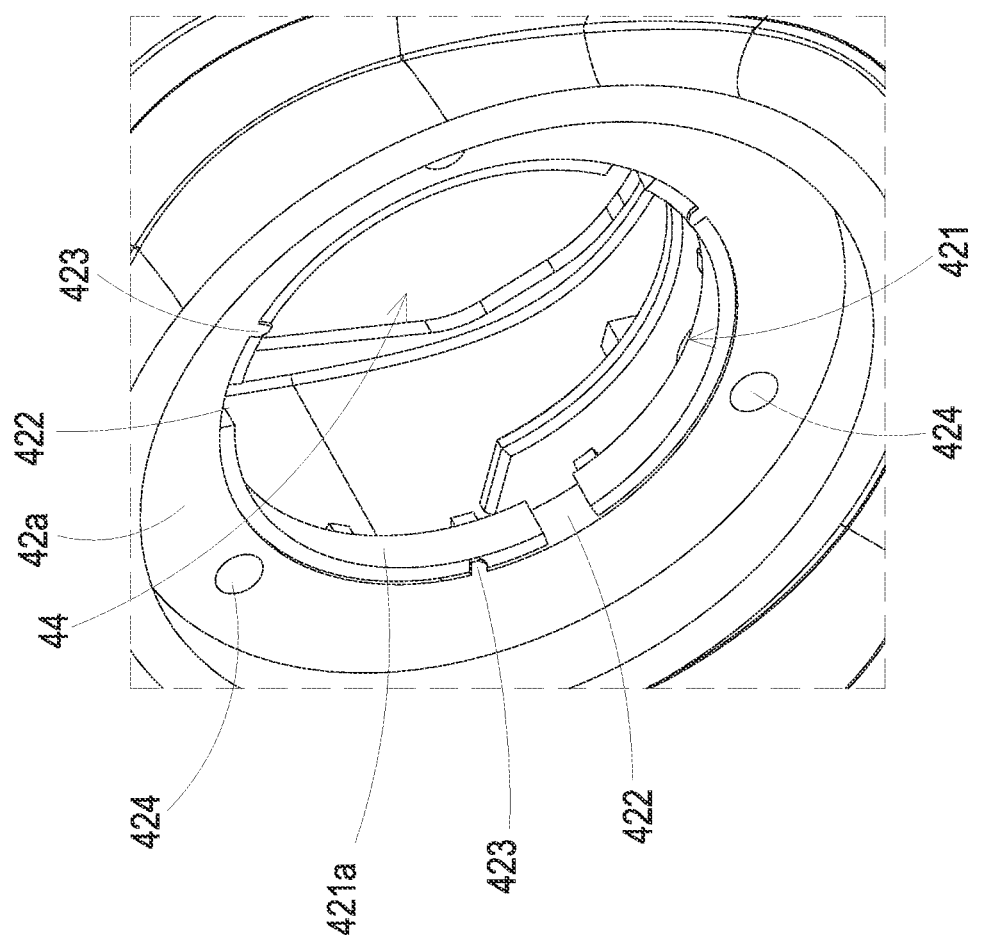
FIG. 4 is a schematic enlarged view illustrating the structure of a front cover of the adapter assembly as shown in FIG. 3.
Figure 5:
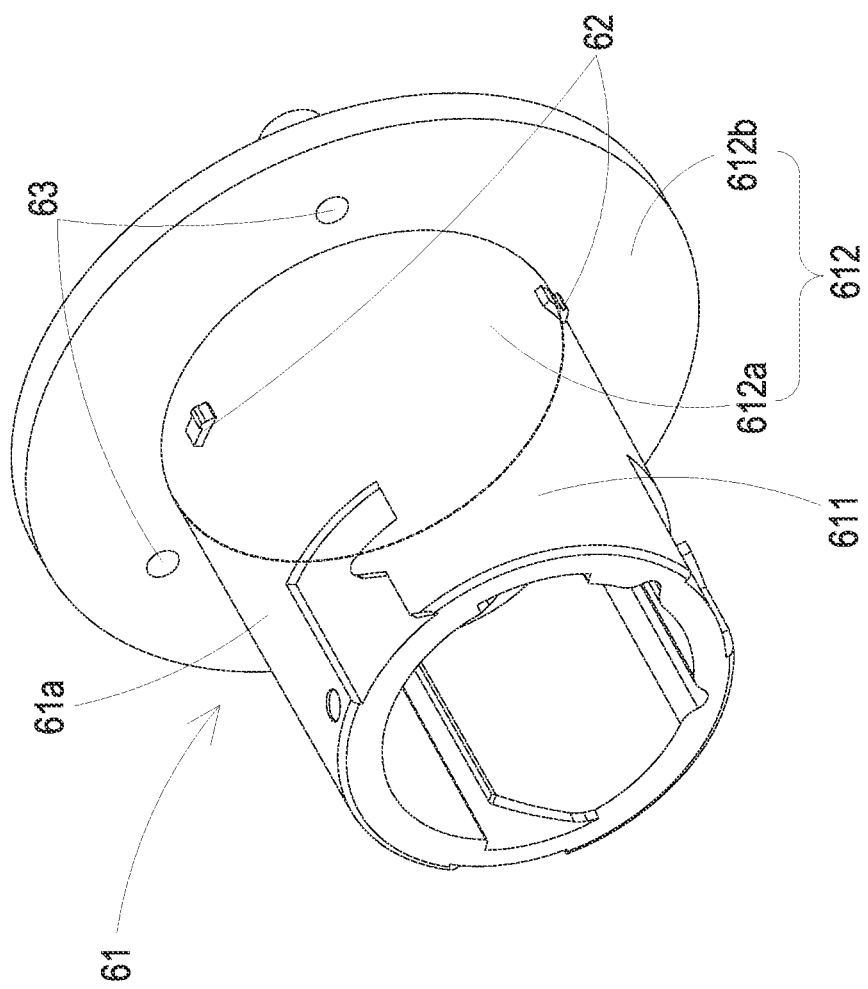
FIG. 5 is a schematic enlarged view illustrating the structure of a plug adapter of the adapter assembly as shown in FIG. 3.
Figure 6:
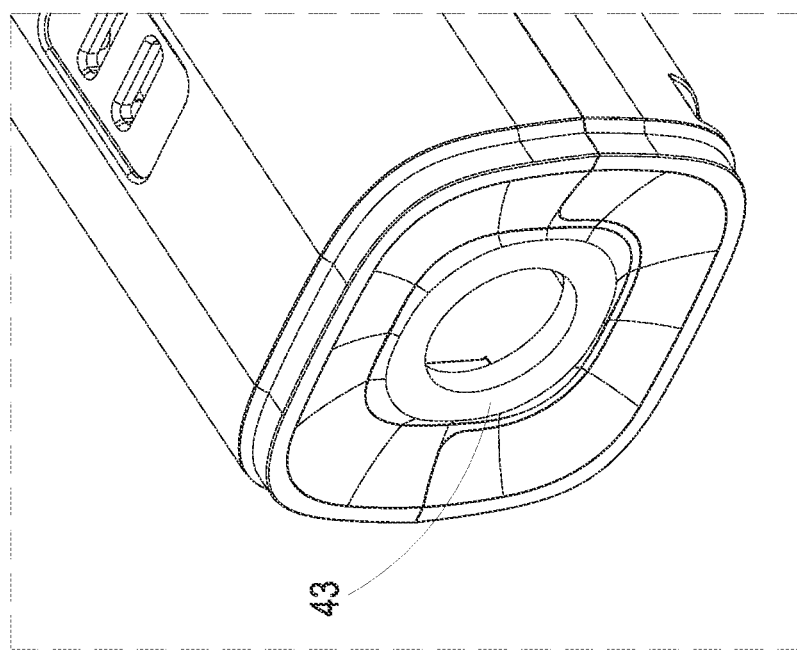
FIG. 6 is a schematic enlarged view illustrating the structure of a rear cover of the adapter assembly as shown in FIG. 3.

Please refer to FIGS. 1 to 6. FIG. 1 is a schematic perspective view illustrating the structure of an adapter assembly applied to a vehicle charger according to an embodiment of the present disclosure. FIG. 2 is a schematic perspective view illustrating the structure of the adapter assembly as shown in FIG. 1 and taken along another viewpoint. FIG. 3 is a schematic exploded view illustrating the structure of the adapter assembly as shown in FIG. 2. FIG. 4 is a schematic enlarged view illustrating the structure of a front cover of the adapter assembly as shown in FIG. 3. FIG. 5 is a schematic enlarged view illustrating the structure of a plug adapter of the adapter assembly as shown in FIG. 3. FIG. 6 is a schematic enlarged view illustrating the structure of a rear cover of the adapter assembly as shown in FIG. 3. The adapter assembly 1 converts the power received by the plug 2 and transmits the power to the vehicle charger 3 so as to charge the electric vehicle (not shown). One end of the adapter assembly 1 is detachably connected with the plug 2 through a first power cable 21, and the other end of the adapter assembly 1 is detachably connected with the vehicle charger 3 through a second power cable 31. The adapter assembly 1 includes a casing 4, a plurality of fastening elements 5 and a plug adapter 6.

As shown in FIGS. 2 and 3, the casing 4 includes a plurality of side walls 41, a front cover 42 and a rear cover 43. The plurality of side walls 41 are connected with each other and disposed between the front cover 42 and the rear cover 43. The front cover 42 and the rear cover 43 are detachably connected with the plurality of side walls 41 and disposed in the two opposite sides of the adapter assembly 1. The plurality of side walls 41, the front cover 42 and the rear cover 43 collaboratively define an accommodation space 44. The accommodation space 44 is located in the interior of the casing 4. The front cover 42 includes an opening 421, a plurality of concaves 422, a plurality of position-limiting portions 423 and a plurality of first holes 424. The opening 421 is in communication with the accommodation space 44. The opening 421 includes an inner surface 421a disposed therearound. The plurality of concaves 422 are concavely formed from the inner surface 421a of the opening 421. The plurality of concaves 422 are formed on the inner surface 421a of the opening 421 and separated from each other at equal interval.

Please refer to FIGS. 2, 3 and 4. The plurality of position-limiting portions 423 are disposed adjacent to a first surface 42a of the front cover 42. The plurality of position-limiting portions 423 are disposed on the inner surface 421a of the opening 421 and separated from each other at equal interval. The plurality of position-limiting portions 423 and the first surface 42a of the front cover 42 are coplanar. Each of the plurality of position-limiting portions 423 is extended toward the opening 421 along the direction which is coplanar to the front cover 42. That is, each of the plurality of position-limiting portions 423 is extended from the inner surface 421a of the opening 421 toward the center of the opening 421. The plurality of position-limiting portions 423 and the plurality of concaves 422 are arranged alternately. That is, each of the plurality of position-limiting portions 423 is disposed between the two adjacent concaves 422. The plurality of first holes 424 are disposed around the opening 421 and separated from each other at equal interval. Preferably but not exclusively, the plurality of fastening elements 5 are self-tapping screws or machine screws.

Figure 13:
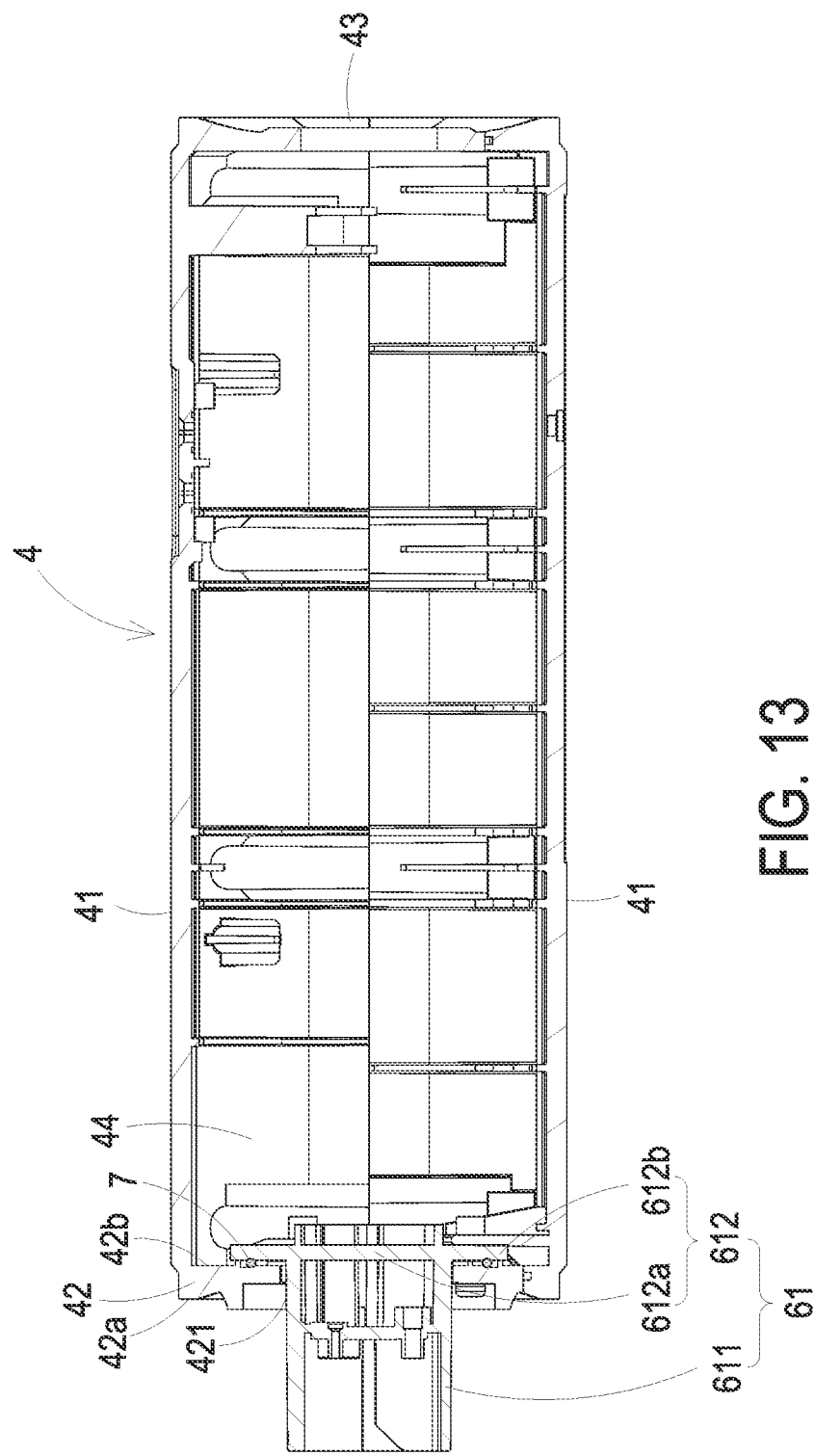
FIG. 13 is a schematic cross-sectional view illustrating the structure of the adapter assembly as shown in FIG. 2 and taken along the line A-A'.

As shown in FIGS. 2 and 3, the plug adapter 6 is detachably assembled with the casing 4. Portion of the plug adapter 6 is disposed in the accommodation space 44. The other portion of the plug adapter 6 is exposed to the exterior of the casing 4. The plug adapter 6 includes a main body 61, a plurality of protrusions 62 and a plurality of second holes 63. Please refer to FIGS. 2, 3 and 5. In some embodiments, the main body 61 includes an outer surface 61a, a cylinder portion 611 and a disc portion 612. The cylinder portion 611 is a hollow cylindrical body. Portion of the cylinder portion 611 is exposed to the exterior of the accommodation space 44 by passing through the opening 421. The disc portion 612 includes a first area 612a and a second area 612b. The first area 612a is located in the center of the disc portion 612. The cylinder portion 611 is disposed on the first area 612a of the disc portion 612. The second area 612b is disposed around the first area 612a and exposed to the exterior of the cylinder portion 611. When the plug adapter 6 is assembled with the casing 4, the second area 612b of the disc portion 612 abuts against the second surface 42b of the front cover 42 of the casing 4, as shown in FIG. 13. The disc portion 612 and the cylinder portion 611 are integrally formed into one piece. The diameter of the second area 612b of the disc portion 612 is greater than the diameter of the opening 421 of the front cover 42. The plurality of protrusions 62 are disposed around the outer surface 61a of the main body 61 and separated from each other at equal interval. When the plug adapter 6 is assembled with the casing 4, the plurality of protrusions 62 are corresponding in position to the plurality of concaves 422 in a one-to-one relationship. During the process of assembling the plug adapter 6 with the casing 4, each of the plurality of protrusions 62 is accommodated in the corresponding concave 422 temporarily. The plurality of second holes 63 are disposed on the second area 612b of the disc portion 612 of the main body 61. The plurality of second holes 63 are disposed around the cylinder portion 611 of the main body 61 and separated from each other at equal interval. The plurality of second holes 63 are corresponding in position to the plurality of first holes 424 in a one-to-one relationship. In this embodiment, the distance between each of the plurality of protrusions 62 and an axis center X1 of the main body 61 of the plug adapter 6 is greater than the distance between the corresponding position-limiting portion 423 and an opening center X2 of the opening 421 of the front cover 42.

Figure 7:
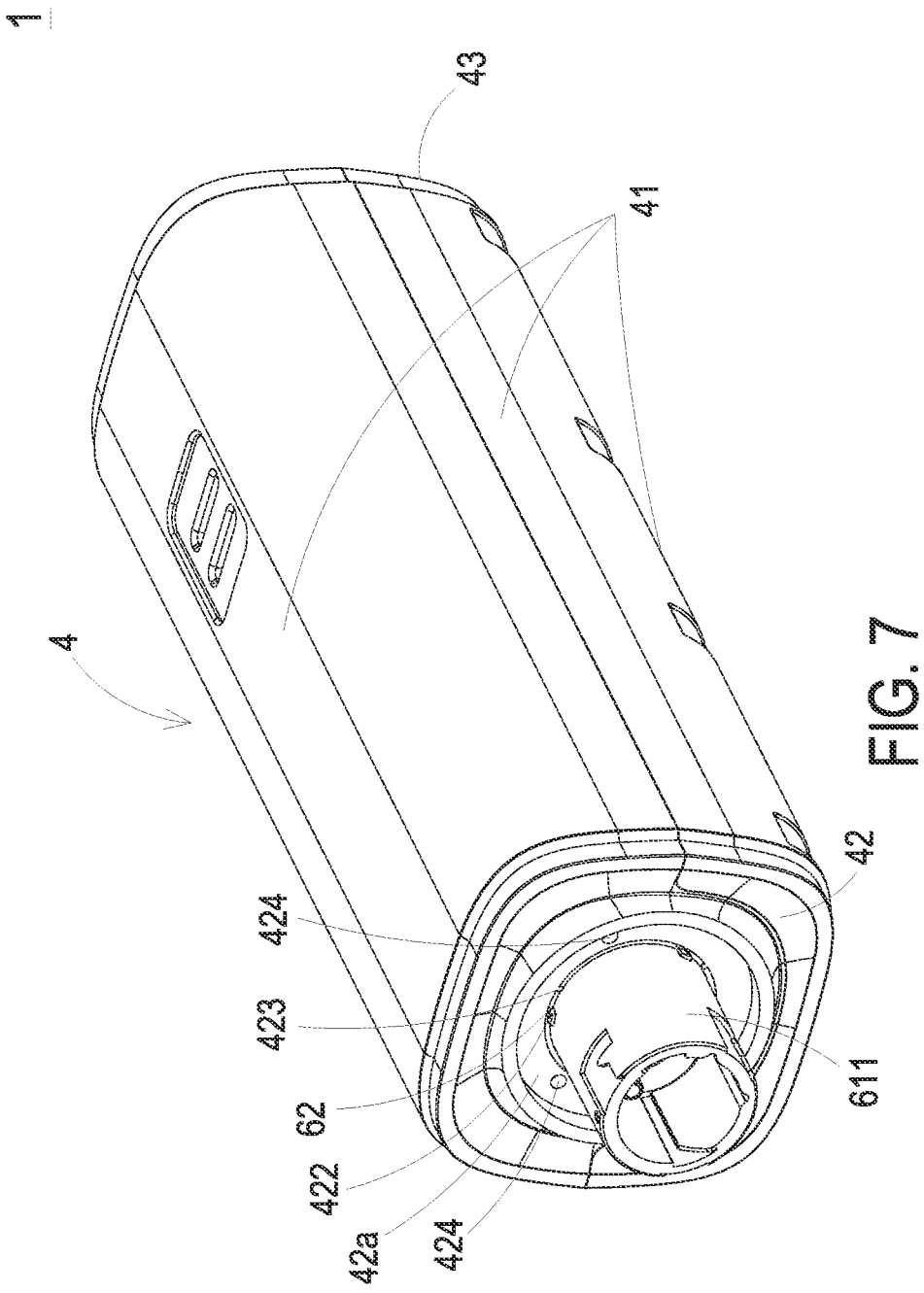
FIG. 7 is a schematic perspective view illustrating the structure of the adapter assembly as shown in FIG. 2, wherein a main body of the adapter assembly passes through an opening of the front cover.
Figure 8:
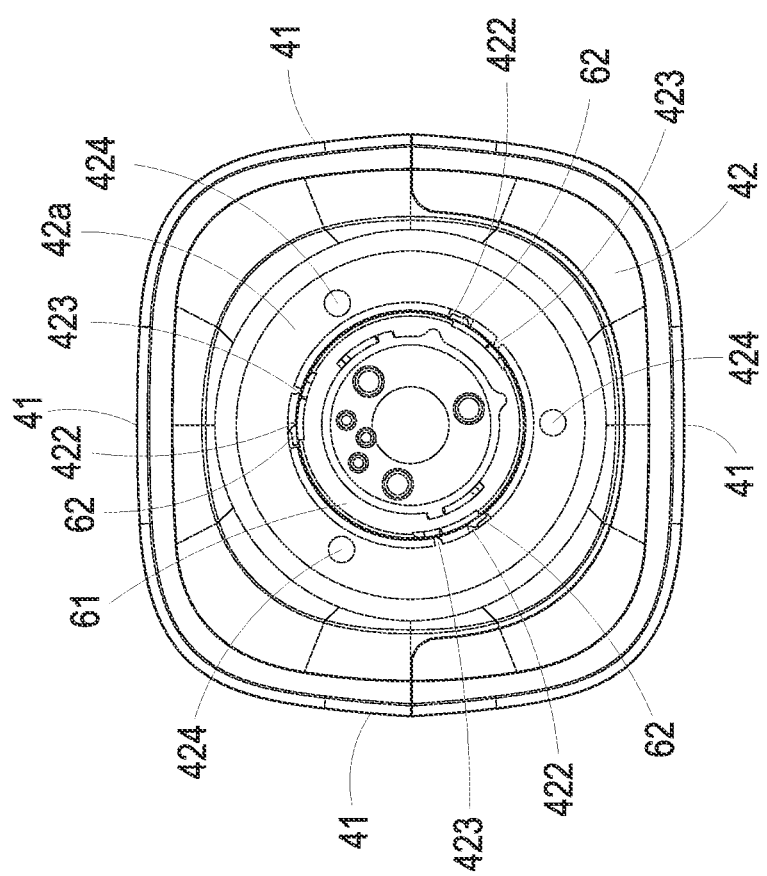
FIG. 8 is a schematic front view illustrating the structure of the adapter assembly as shown in FIG. 7.
Figure 9:
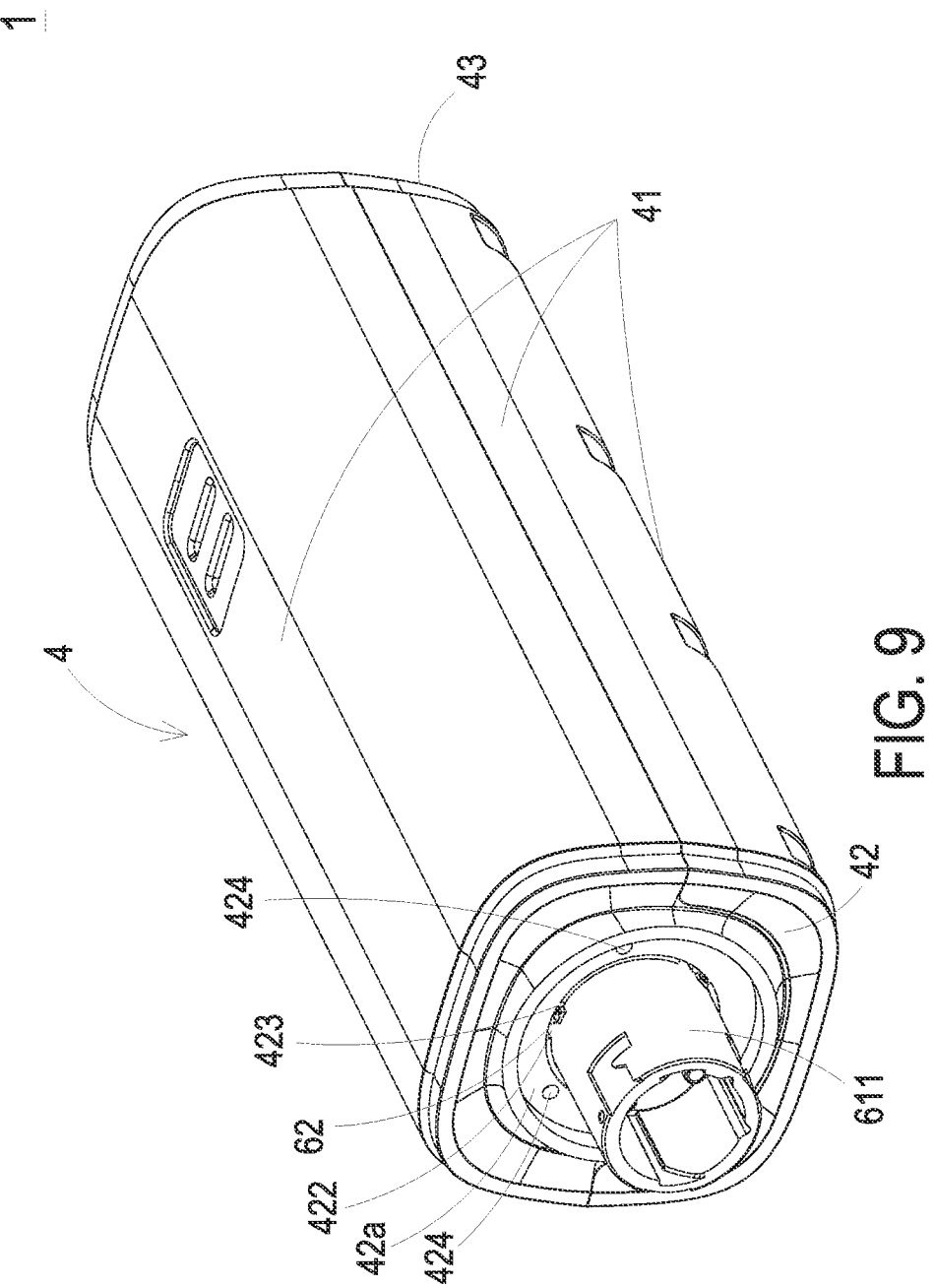
FIG. 9 is a schematic perspective view illustrating the structure of the adapter assembly as shown in FIG. 2, wherein a protrusion of the plug adapter is connected with a position-limiting portion of the front cover.
Figure 10:
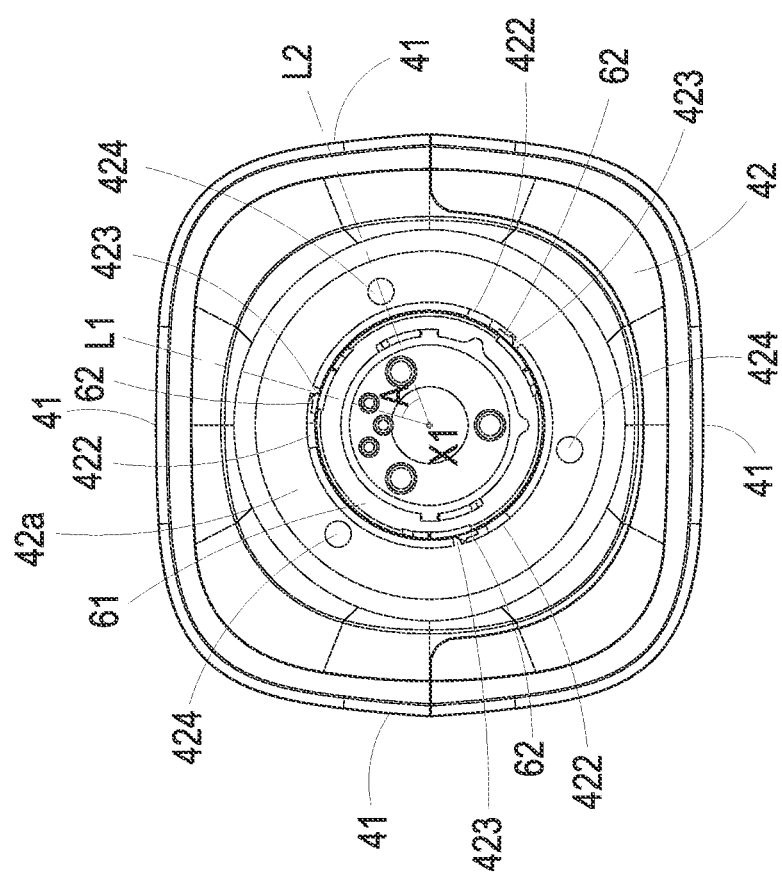
FIG. 10 is a schematic front view illustrating the structure of the adapter assembly as shown in FIG. 9.
Figure 11:
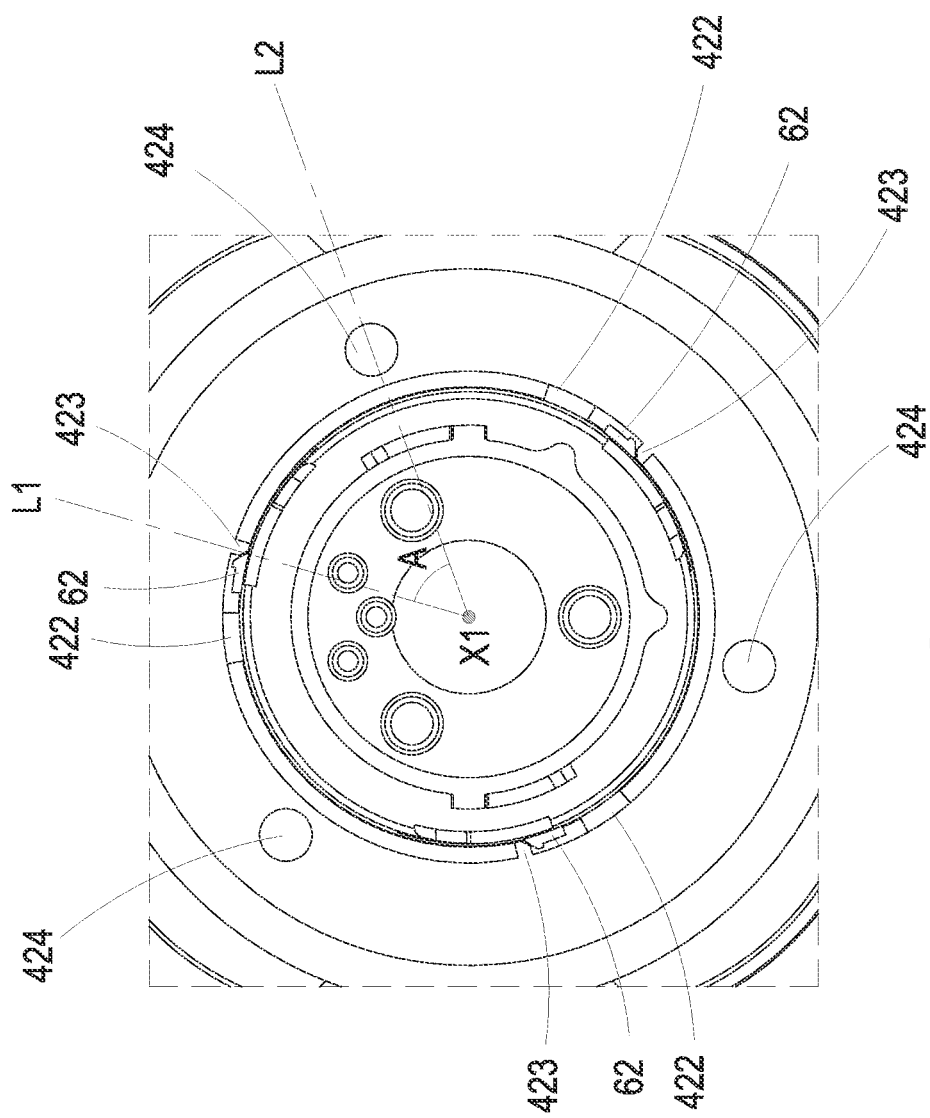
FIG. 11 is a schematic enlarged view illustrating the structure of the adapter assembly as shown in FIG. 10.

Please refer to FIGS. 1 to 3 and FIGS. 7 to 10. FIG. 7 is a schematic perspective view illustrating the structure of the adapter assembly as shown in FIG. 2, wherein the main body of the adapter assembly passes through the opening of the front cover. FIG. 8 is a schematic front view illustrating the structure of the adapter assembly as shown in FIG. 7. FIG. 9 is a schematic perspective view illustrating the structure of the adapter assembly as shown in FIG. 2, wherein the protrusion of the adapter is connected with the position-limiting portion of the front cover. FIG. 10 is a schematic front view illustrating the structure of the adapter assembly as shown in FIG. 9. As shown in FIGS. 7 and 8, an upper portion of the front cover 42, an upper portion of the rear cover 43 and the side walls 41 located between the upper portion of the front cover 42 and the upper portion of the rear cover 43 are formed into an upper component of the casing 4 collaboratively. A lower portion of the front cover 42, a lower portion of the rear cover 43 and the side walls 41 located between the lower portion of the front cover 42 and the lower portion of the rear cover 43 are formed into a lower component of the casing 4 collaboratively. When the plug adapter 6 is assembled with the casing 4, the upper component of the casing 4 and the lower component of the casing 4 are separated from each other so that portion of the plug adapter 6 can be disposed in the accommodation space 44 through the space between the upper component and the lower component of the casing 4. Then, the upper component and the lower component of the casing 4 are reassembled with each other, and the axis center X1 of the main body 61 of the plug adapter 6 and the opening center X2 of the opening 421 of the front cover 42 are aligned to each other. During the process of assembling the plug adapter 6 with the casing 4, portion of the main body 61 of the plug adapter 6 (i.e., the disc portion 612 and portion of the cylinder portion 611) is accommodated in the accommodated space 44. The other portion of the main body 61 of the plug adapter 6 (i.e., the other portion of the cylinder portion 611) passes through the opening 421 and is exposed to the exterior of the accommodation space 44. Each of the plurality of protrusions 62 of the plug adapter 6 passes through the corresponding concave 422 and is exposed to the exterior of the accommodation space 44. Then, as shown in FIGS. 9, 10 and 11, each of the plurality of protrusions 62 exposed to the exterior of the accommodation space 44 is connected with the corresponding position-limiting portion 423 through the rotation of the plug adapter 6. Each of the plurality of fastening elements 5 is plugged into the corresponding first hole 424 and the corresponding second hole 63 so that the plug adapter 6 is assembled with the casing 4 through the fastening element 5. Consequently, the adapter assembly 1 as shown in FIG. 2 is formed. In some embodiments, each of the plurality of protrusions 62 exposed to the exterior of the accommodation space 44 abuts against the corresponding position-limiting portion 423 through the rotation of the plug adapter 6. Preferably but not exclusively, each of the plurality of protrusions 62 exposed to the exterior of the accommodation space 44 is engaged with the corresponding position-limiting portion 423 through the rotation of the plug adapter 6.

From the above descriptions, the present disclosure provides an adapter assembly 1. Portion of the main body 61 of the plug adapter 6 is penetrated through the opening 421 of the front cover 42 and exposed to the exterior of the accommodation space 44. Each of the plurality of protrusions 62 is penetrated through the corresponding concave 422 and exposed to the exterior of the accommodation space 44. Each of the plurality of protrusions 62 exposed to the exterior of the accommodation space 44 is connected with the corresponding position-limiting portion 423 through the rotation of the plug adapter 6. Each of the plurality of fastening elements 5 is plugged into the corresponding first hole 424 and the corresponding second hole 63 so that the plug adapter 6 is assembled with the casing 4 through the fastening element 5. In the conventional adapter assembly, the adapter is fastened to the casing by utilizing the screw merely, so that the screw is fallen off easily when the screw is subjected to an impact. In comparison with the conventional adapter assembly, the plug adapter 6 of the adapter assembly 1 of the present disclosure is fastened to the casing 4 by utilizing the fastening element 5 and the connection between the protrusion 62 of the plug adapter 6 and the position-limiting portion 423 of the casing 4. When the adapter assembly 1 is fallen off and subjected to an impact, the adapter assembly 1 includes two impact bearing points. One is formed by the fastening element 5, and the other is formed by the connection between the protrusion 62 and the position-limiting portion 423. The adapter assembly 1 of the present disclosure has more impact bearing points than the conventional adapter assembly. The components of the adapter assembly 1 of the present disclosure are not separated with each other easily. The stability and the waterproof capability of the adapter assembly 1 are enhanced.

Please refer to FIGS. 2 and 3 again. The front cover 42 has the first surface 42a and a second surface 42b, as shown in FIG. 13. The first surface 42a and the second surface 42b of the front cover 42 are opposite to each other. The second surface 42b is adjacent to the accommodation space 44 relative to the first surface 42a. The first surface 42a is located away from the accommodation space 44 relative to the second surface 42b. The plurality of first holes 424 run through the first surface 42a and the second surface 42b of the front cover 42. The fastening element 5 is plugged into the corresponding first hole 424 and the corresponding second hole 63 from the first surface 42a of the front cover 42 in sequence so that the plug adapter 6 is fastened to the casing 4. From the above descriptions, the adapter of the conventional adapter assembly is fastened to the casing through the screw from the interior of the casing. In comparison with the conventional adapter assembly, the plug adapter 6 is fastened to the casing 4 through fastening element 5 from the exterior of the casing 4. The application flexibility of the adapter assembly 1 of the present disclosure is enhanced, and the adapter assembly 1 is assembled easily. Alternatively, in some embodiments, the fastening element 5 is penetrated though the corresponding second hole 63 and the corresponding first hole 424 from the second surface 42b of the front cover 42 in sequence so that the plug adapter 6 is fastened to the casing 4.

Please refer to FIGS. 10 and 11. FIG. 11 is a schematic enlarged view illustrating the structure of the adapter assembly as shown in FIG. 10. In this embodiment, the number of the first holes 424, the number of the concaves 422, the number of the position-limiting portions 423 and the number of the protrusions 62 of the plug adapter 6 are identical. Preferably but not exclusively, the number of the first holes 424, the number of the concaves 422, the number of the position-limiting portions 423 and the number of the protrusions 62 are three, respectively. When the plug adapter 6 is assembled with the casing 4, the axis center X1 of the main body 61 of the plug adapter 6 and the opening center X2 of the opening 421 of the front cover 42 of the casing 4 are aligned to each other. As shown in FIG. 10, the axis center X1 of the main body 61 of the plug adapter 6 is presented. When any one of the plurality of protrusions 62 is connected with the corresponding position-limiting portion 423, a line passing through one protrusion 62 and the axis center X1 is defined as a first line L1. A line passing through the first hole 424 adjacent to the protrusion 62 and the axis center X1 is defined as a second line L2. An angle A is formed between the first line L1 and the second line L2. The angle A is less than 180 degrees. The angle A is equal to 360 degrees divided to the sum of the number of the position-limiting portions 423 and the number of the first holes 424. For example, the number of the position-limiting portions 423 and the number of the first hole 424s are three, respectively. The angle A between the first line L1 and the second line L2 is 360/(3+3) degrees (i.e., 60 degrees). Consequently, when any one of the plurality of protrusions 62 is connected with the corresponding position-limiting portion 423, the distance between the protrusion 62 and the adjacent first hole 424 is equal to the distance between the other of the plurality of protrusions 62 and the first hole 424 adjacent to the other protrusion 62, so that the force can be evenly distributed when the adapter assembly 1 is subjected to an impact. The stability of the adapter assembly 1 is enhanced.

Figure 12:
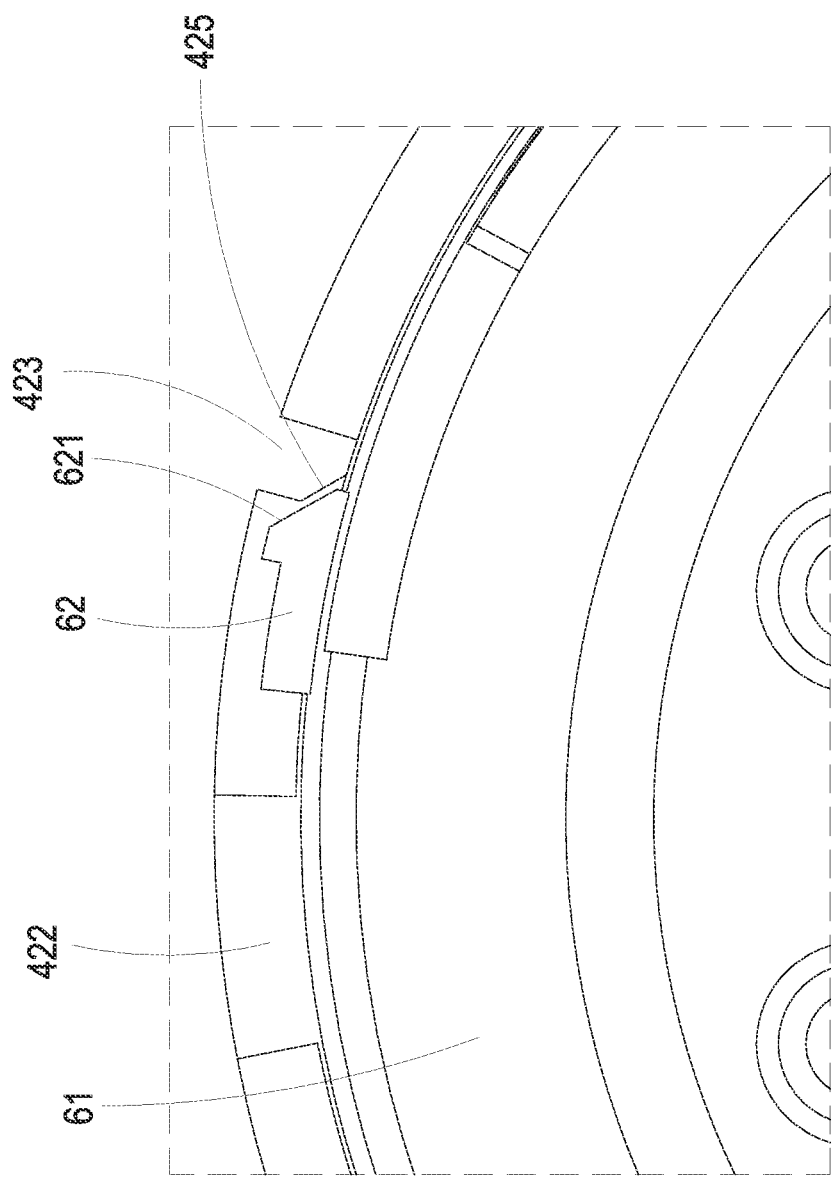
FIG. 12 is a schematic perspective view illustrating a portion of the structure of the adapter assembly as shown in FIG. 10.

Please refer to FIGS. 10, 11 and 12. FIG. 12 is a schematic perspective view illustrating a portion of the structure of the adapter assembly as shown in FIG. 10. In this embodiment, each of the plurality of protrusions 62 of the plug adapter 6 includes a first inclined surface 621. The first inclined surface 621 is adjacent to the corresponding position-limiting portion 423. Each of the plurality of position-limiting portions 423 of the casing 4 includes a second inclined surface 425. The second inclined surface 425 is adjacent to the first inclined surface 621 of the corresponding protrusion 62. When the plug adapter 6 is assembled with the casing 4, the first inclined surface 621 of each of the plurality of protrusions 62 is connected with the second inclined surface 425 of the corresponding position-limiting portion 423 so that the plug adapter 6 is assembled with the casing 4 tightly.

Please refer to FIGS. 2, 3 and 13. FIG. 13 is a schematic cross-sectional view illustrating the structure of the adapter assembly as shown in FIG. 2 and taken along the line A-A'. In some embodiments, the adapter assembly 1 includes a sealing ring 7. The sealing ring 7 is disposed between the second area 612b of the disc portion 612 of the main body 61 of the plug adapter 6 and the second surface 42b of the front cover 42 of the casing 4. The sealing ring 7 is used to seal the space between the second area 612b of the disc portion 612 and the second surface 42b of the front cover 42 for avoiding the moisture to enter the interior of the casing 4 through the space easily.

From the above descriptions, the present disclosure provides an adapter assembly. Portion of the main body of the plug adapter is penetrated through the opening of the front cover and exposed to the exterior of the accommodation space. Each of the plurality of protrusions is penetrated through the corresponding concave and exposed to the exterior of the accommodation space. Each of the plurality of protrusions exposed to the exterior of the accommodation space is connected with the corresponding position-limiting portion through the rotation of the plug adapter. Each of the plurality of fastening elements is plugged into the corresponding first hole and the corresponding second hole so that the plug adapter is assembled with the casing through the fastening element. The plug adapter of the adapter assembly of the present disclosure is fastened to the casing by utilizing the fastening element and the connection between the protrusion of the plug adapter and the position-limiting portion of the casing. When the adapter assembly is fallen off and subjected to an impact, the adapter assembly includes two impact bearing points. One is formed by the fastening element, and the other is formed by the connection between the protrusion and the position-limiting portion. The adapter assembly of the present disclosure has more impact bearing points than the conventional adapter assembly. The components of the adapter assembly of the present disclosure are not separated with each other easily. The stability and the waterproof capability of the adapter assembly are enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An adapter assembly, comprising:
a casing comprising a plurality of side walls, a front cover and a rear cover, wherein the plurality of side walls are connected with each other and disposed between the front cover and the rear cover, the plurality of side walls, the front cover and the rear cover collaboratively defines an accommodation space located in the casing, the front cover comprises an opening, a plurality of concaves and a plurality of position-limiting portions, the opening is in communication with the accommodation space, the plurality of concaves are concavely formed from an inner surface of the opening, the plurality of position-limiting portions are disposed on the inner surface of the opening of the front cover, each of the plurality of position-limiting portions is extended from the inner surface of the opening toward a center of the opening, and the plurality of position-limiting portions and the plurality of concaves are arranged alternately; and
a plug adapter detachably assembled with the casing and comprising a main body and a plurality of protrusions, wherein the plurality of protrusions are disposed on an outer surface of the main body, and the plurality of protrusions are corresponding in position to the plurality of concaves in a one-to-one relationship;
wherein when the plug adapter is assembled with the casing, portion of the main body is disposed in the accommodation space, the other portion of the main body is penetrated through the opening and exposed to the exterior of the accommodation space, each of the plurality of protrusions is penetrated through corresponding one of the plurality of concaves and exposed to the exterior of the accommodation space, and each of the plurality of protrusions exposed to the exterior of the accommodation space is connected with corresponding one of the plurality of position-limiting portions through the rotation of the plug adapter so that the plug adapter is assembled with the casing.

2. The adapter assembly according to claim 1, wherein when the plug adapter is assembled with the casing, each of the plurality of protrusion exposed to the exterior of the accommodation space abuts against the corresponding one of the plurality of position-limiting portions.

3. The adapter assembly according to claim 1, wherein the adapter assembly comprises a plurality of fastening elements, the front cover comprises a plurality of first holes, the plug adapter comprises a plurality of second holes, the plurality of first holes are corresponding in position to the plurality of second holes in a one-to-one relationship, and each of the plurality of fastening element is plugged into corresponding one of the plurality of first holes and corresponding one of the plurality of second holes.

4. The adapter assembly according to claim 3, wherein the plug adapter comprises a cylinder portion and a disc portion, the cylinder portion is a hollow cylindrical body, the cylinder portion is penetrated through the opening, portion of the cylinder portion is exposed to the exterior of the accommodation space, the disc portion comprises a first area and a second area, the first area is disposed on a center of the disc portion, the cylinder portion is disposed on the first area, and the second area is disposed around the first area and exposed to the exterior of the cylinder portion, wherein when the plug adapter is assembled with the casing, the second area of the disc portion abuts against the front cover of the casing, wherein a diameter of the second area of the disc portion is greater than a diameter of the opening of the front cover.

5. The adapter assembly according to claim 4, wherein the plurality of second holes are disposed on the second area of the disc portion, and the plurality of second holes are disposed around the cylinder portion of the main body and separated with each other at equal interval.

6. The adapter assembly according to claim 4, wherein the adapter assembly comprises a sealing ring, the sealing ring is disposed between the second area of the disc portion and the front cover of the casing, and the sealing ring seals a space between the second area of the disc portion and the front cover.

7. The adapter assembly according to claim 3, wherein the front cover has a first surface and a second surface, the first surface and the second surface are opposite to each other, the second surface is adjacent to the accommodation space relative to the first surface, the first surface is located away the accommodation space relative to the second surface, and the fastening element is plugged into the corresponding one of the plurality of first holes and the corresponding one of the plurality of second holes in sequence.

8. The adapter assembly according to claim 3, wherein when the plug adapter is assembled with the casing and any one of the plurality of protrusions is connected with the corresponding one of the plurality of position-limiting portions, a first line passes through corresponding one of the plurality of protrusions and an axis center of the main body, a second line passes through the corresponding one of the plurality of first holes adjacent to the corresponding one of the plurality of protrusions and the axis center of the main body, an angle is formed between the first line and the second line, and the angle is equal to 360 degrees divided to the sum of the number of the plurality of position-limiting portions and the number of the plurality of first holes.

9. The adapter assembly according to claim 3, wherein the plurality of fastening elements are self-tapping screws or machine screws.

10. The adapter assembly according to claim 1, wherein each of the plurality of protrusions comprises a first inclined surface, the first inclined surface is adjacent to the corresponding one of the plurality of position-limiting portions, each of the plurality of position-limiting portions comprises a second inclined surface, and the second inclined surface is adjacent to the first inclined surface of the corresponding one of the plurality of protrusions, wherein when the plug adapter is assembled with the casing, the first inclined surface of each of the plurality of protrusions is connected with the second inclined surface of the corresponding one of the plurality of position-limiting portions.

\* \* \* \* \*